(12) United States Patent
Patel et al.

(10) Patent No.: US 11,321,139 B2
(45) Date of Patent: May 3, 2022

(54) STREAMING TRAFFIC PATTERN FOR PUBLIC CLOUD AUTO SCALING

(71) Applicant: salesforce.com, inc., San Francisco, CA (US)

(72) Inventors: Yogesh Patel, Dublin, CA (US); William Victor Gray, Kitchener (CA); William Hackett, Vallejo, CA (US); Shaahin Mehdinezhad Rushan, Dublin, CA (US); Johannes Kienzle, Oakland, CA (US); Shreedhar Sundaram, San Mateo, CA (US); Mahalaxmi Sanathkumar, San Francisco, CA (US); Rajkumar Pellakuru, San Jose, CA (US); Bhaves Patel, Pittsburg, CA (US); Bertha Ching Wai Lam, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/994,162

(22) Filed: May 31, 2018

(65) Prior Publication Data

US 2019/0370080 A1    Dec. 5, 2019

(51) Int. Cl.
*G06F 9/50*    (2006.01)
*G06F 9/455*    (2018.01)
(Continued)

(52) U.S. Cl.
CPC ........ *G06F 9/5077* (2013.01); *G06F 9/45558* (2013.01); *H04L 43/065* (2013.01);
(Continued)

(58) Field of Classification Search
CPC ............... G06F 9/5077; G06F 9/45558; G06F 2009/4557; H04L 43/065; H04L 43/067; H04L 43/0876
(Continued)

(56) References Cited

U.S. PATENT DOCUMENTS 7,287,180 B1 *  10/2007  Chen .................... G06F 11/2033
                                                     714/11
9,569,277 B1 *   2/2017  Cropper .............. G06F 9/45558
(Continued)

FOREIGN PATENT DOCUMENTS

WO    WO-2016134542 A1 *  9/2016  ............... G06F 9/50

OTHER PUBLICATIONS

Arista, Arista CloudVision: Cloud Automation for Everyone, 2017 (Year: 2017).*
(Continued)

*Primary Examiner* — Schquita D Goodwin
(74) *Attorney, Agent, or Firm* — Wong & Rees LLP; Zhichong Gu

(57) ABSTRACT

A total number of messages in a set of messages that are processed by a computing node in a virtual computer cluster during a time interval is determined. The virtual computer cluster is deployed with a cloud computing service and includes the computing node and other computing nodes at an end time of the time interval. It is determined whether the total number of messages in the set of messages processed by the computing node is no less than a maximum per-interval message number threshold. In response to determining that the total number of messages is no less than a maximum per-interval message number threshold, the cloud computing service is caused to start an additional computing node in the virtual computer cluster after the time interval, wherein the additional computing node is used to process
(Continued)

one or more subsequent messages to be processed after the time interval.

21 Claims, 7 Drawing Sheets

(51) Int. Cl.
| | | |
|---|---|---|
| *H04L 12/26* | (2006.01) | |
| *H04L 43/067* | (2022.01) | |
| *H04L 43/0876* | (2022.01) | |
| *H04L 43/065* | (2022.01) | |

(52) U.S. Cl.
CPC ........ *H04L 43/067* (2013.01); *H04L 43/0876* (2013.01); *G06F 2009/4557* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 9,710,859 | B1* | 7/2017 | Theimer | G06Q 40/10 |
| 10,782,990 | B1* | 9/2020 | Suarez | G06F 9/5005 |
| 2011/0167421 | A1* | 7/2011 | Soundararajan | G06F 9/45533 |
| | | | | 718/1 |
| 2014/0351429 | A1* | 11/2014 | Madani | H04L 47/70 |
| | | | | 709/224 |
| 2015/0082432 | A1* | 3/2015 | Eaton | G06F 9/5072 |
| | | | | 726/23 |
| 2015/0281113 | A1* | 10/2015 | Siciliano | G06F 9/505 |
| | | | | 709/226 |
| 2015/0339150 | A1* | 11/2015 | Yanagisawa | G06F 9/4401 |
| | | | | 718/1 |
| 2015/0381711 | A1 | 12/2015 | Singh et al. | |
| 2016/0019074 | A1* | 1/2016 | Nahir | G06F 9/5077 |
| | | | | 718/1 |
| 2016/0057076 | A1 | 2/2016 | Zlati et al. | |
| 2016/0094401 | A1* | 3/2016 | Anwar | G06F 11/3006 |
| | | | | 709/223 |
| 2016/0103717 | A1* | 4/2016 | Dettori | G06F 9/5072 |
| | | | | 719/318 |
| 2016/0134558 | A1* | 5/2016 | Steinder | H04L 47/783 |
| | | | | 709/226 |
| 2016/0323377 | A1* | 11/2016 | Einkauf | H04L 67/1076 |
| 2017/0093755 | A1* | 3/2017 | Pol | G06F 9/505 |
| 2017/0185441 | A1* | 6/2017 | Hay | G06F 9/455 |
| 2017/0235613 | A1* | 8/2017 | Smola | G06F 9/5083 |
| | | | | 718/1 |
| 2017/0344393 | A1* | 11/2017 | Ansari | G06F 9/5083 |
| 2018/0039494 | A1* | 2/2018 | Lander | G06F 11/3688 |
| 2018/0097744 | A1* | 4/2018 | Hu | H04L 47/823 |
| 2018/0176289 | A1* | 6/2018 | Watanabe | H04L 61/1511 |
| 2018/0196867 | A1* | 7/2018 | Wiesmaier | G06F 16/285 |
| 2018/0300174 | A1 | 10/2018 | Karanasos et al. | |
| 2018/0324204 | A1* | 11/2018 | McClory | G06F 8/71 |
| 2018/0375897 | A1* | 12/2018 | Kawasaki | H04L 63/1491 |
| 2019/0042286 | A1* | 2/2019 | Bailey | G06F 9/455 |
| 2019/0102717 | A1* | 4/2019 | Wu | G06Q 10/06375 |
| 2019/0130327 | A1* | 5/2019 | Carpenter | G06N 20/00 |
| 2019/0138939 | A1* | 5/2019 | Devaraju | G05B 23/0289 |
| 2019/0205173 | A1* | 7/2019 | Gupta | G06F 16/182 |
| 2019/0317826 | A1 | 10/2019 | Jain et al. | |
| 2019/0373031 | A1 | 12/2019 | Patel et al. | |

OTHER PUBLICATIONS

U.S. Appl. No. 15/994,126, Final Office Action dated May 26, 2020.
U.S. Appl. No. 15/994,126, Non-Final Office Action dated Feb. 6, 2020.
U.S. Appl. No. 15/994,126, Notice of Allowance dated Sep. 16, 2020.

* cited by examiner

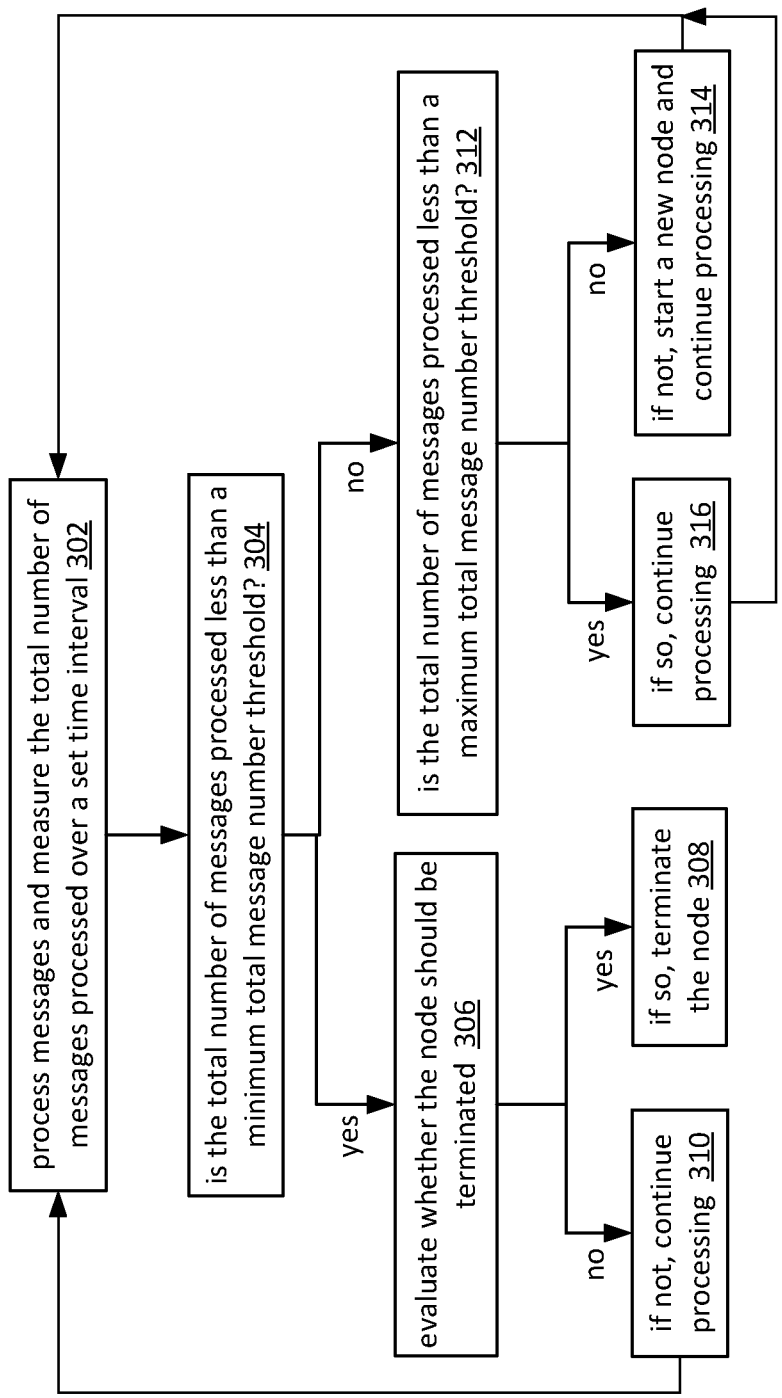

STREAMING TRAFFIC PATTERN FOR PUBLIC CLOUD AUTO SCALING

TECHNICAL FIELD

The present invention relates generally to cloud-based computing, and in particular, to streaming traffic pattern for public cloud auto scaling.

BACKGROUND

A large-scale cloud-based multitenant computing system may include multiple data centers at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

The multitenant computing system may exchange data and metrics with external systems over a network cloud for the purpose of providing services (e.g., artificial-intelligence-based services, etc.) to some or all organizations hosted at the multitenant computing system. Virtual clusters of computers may be deployed in the network cloud with cloud computing services to process, generate and/or forward messages encapsulating the data and metrics between the external systems and the multitenant computing system. While deploying virtual clusters of computers in the network cloud may have many potential advantages over deploying physical computers on premises, it is quite challenging to properly scale the virtual clusters of computers to achieve optimal performances and fast responses while reducing costs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3 and FIG. 4 illustrate example process flows; and

DESCRIPTION OF EXAMPLE EMBODIMENTS

Figure 1:
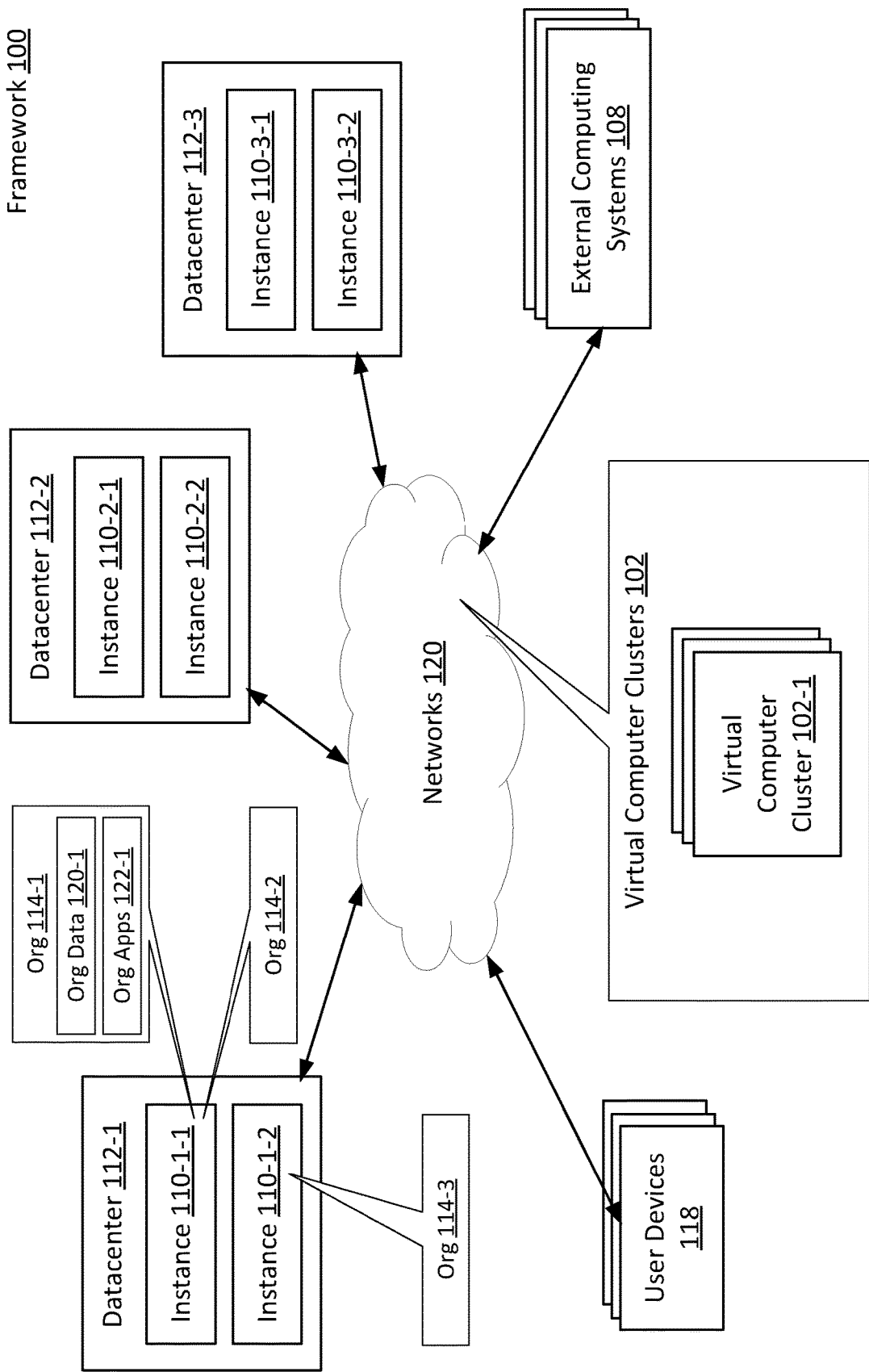
FIG. 1 illustrates an example overall framework 100 for processing messages between a first computing system and one or more second computing systems.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. General Overview
2.0. Functional Overview
   2.1 System Configuration
   2.2 Node Configurations
   2.3 Message Processing
   2.4 Example Cluster Implementation
   2.5 Cluster Scaling
3.0. Example Embodiments
4.0 Implementation Mechanism—Hardware Overview
5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Under techniques as described herein, data exchanged between a multitenant computing system (e.g., one or more data centers therein, one or more system instances in one or more data centers therein, etc.) and an external computing system may be encapsulated or carried in messages mediated through one or more virtual computer clusters (or cloud-based clusters of virtual computers) between the multitenant computing system and the external computing system. Example messages as described herein may include, but are not necessarily limited to only, any of: platform-bound messages to the multitenant computing system, platform-originated messages from the multitenant computing system, external-system-bound messages to an external computing system, external-system-originated messages from an external computing system, and so forth.

Virtual computer clusters can be deployed using cloud computing services (e.g., Amazon Web Services or AWS, Microsoft Azure Cloud, etc.). These virtual computer clusters can be used to implement streamers (or streaming applications) for processing or streaming messages as described herein.

By way of example but not limitation, a virtual computer cluster can be deployed using Amazon AWS in one or more networks to stream messages between or among different computing systems connected to the networks. The virtual computer cluster may comprise a number of nodes (or virtual computers) collectively implementing one or more computer applications to provide a message streamer platform for exchanging messages between a first computing system such as a multitenant computing system and one or more external computing systems.

Each node in the virtual computer cluster (102-1) can be created with an AWS stack to represent a (virtual) computer (e.g., M4large virtual EC2 instances, etc.) equipped/allocated with a collection of resources such as one or more CPUs, RAM spaces, non-volatile storage media, operational systems, network interfaces/capabilities, database interfaces/capabilities, supported communication protocol stacks, etc. In various embodiments, different nodes in the same virtual computer cluster (102-1) may or may not be provisioned with the same system configuration.

To minimize costs (e.g., subscription fees per node, subscription fees per unit time, subscription fees per used resource per unit time, for work performed on each message by the virtual computer cluster, etc.) charged by the cloud computing service for provisioning nodes and other resources in the virtual computer cluster, the virtual computer cluster may be sized or scaled based on cost, workload and performance requirements of the computer applications to be collectively implemented by nodes of the virtual computer cluster. As used herein, a unit cost may be associated with each node in a virtual computer cluster as described herein. Thus, an overall cost for operating the virtual computer cluster may at least include a cost that is proportional to the total number of nodes present at a time (e.g., at a measuring time period, etc.) to serve in the virtual computer cluster. Workload may be measured by the total number of messages processed by the virtual computer cluster over a measurement time period.

Cost consideration/minimization may be especially important in operational scenarios in which numerous virtual computer clusters are used to run computer applications to enable a large-scale multitenant computing system and numerous external systems operating together to provide a wide variety of standard platform services, add-on services, standard service features, augmented service features, etc., to a large number of organizations hosted by the multitenant computing system.

Under some approaches, cloud computing services may scale a virtual computer cluster based on computing resource usages such as CPU load, memory usages, etc. However, these approaches do not take into account messages of different types and are not optimized to reduce unit costs per message processed.

Under these approaches, an internal capacity of a node in a virtual computer cluster is defined (e.g., statically, etc.) for both steady-state and non-steady-state jobs that are to be supported by the virtual computer cluster. For example, a node in the virtual computer cluster may be statically configured to run up to a specific number (e.g., five (5), etc.) of non-streaming jobs such as day 0 jobs (e.g., for five (5) different organizations, etc.) at a first time frequency or in a time interval of a first specific length (e.g., 300,000 seconds, etc.). In addition, the node in the virtual computer cluster may be statically configured to run up to a specific number (e.g., four (4), etc.) of streaming jobs (e.g., for four (4) different organizations, etc.) at a second time frequency or in a time interval of a second specific length (e.g., 20,000 seconds, etc.). In addition, autoscaling functionality as supported by the cloud computing service may be used to scale the total number of nodes in the virtual computer cluster based on CPU usages and memory usages (or some other system resource usages).

However, these approaches have problems in dealing with variations of workloads at runtime. For example, in some operational scenarios, average or peak workload over weekends can be significantly lower (e.g., ten times, etc.) than average or peak workload over weekdays. Average or peak workload over some week days (e.g., Tuesday, etc.) can be significantly lower than average or peak workload over weekdays some week days (e.g., Monday, etc.). Average or peak workload over some hours (e.g., lunch hours, etc.) on a workday can be significantly lower than average or peak workload over some other hours (e.g., busy office hours, etc.) on the same workday.

In addition, under these approaches, statically provisioning resources/capacities per node for processing or streaming messages of both steady-state and non-steady-state jobs and using autoscaling functionality of the cloud computing service to adjust the total number of nodes between a minimum total number of nodes and a maximum total number of nodes based on system resource usages can lead to large wastes of computing resources in the virtual computer cluster in terms of untapped system resources and the large total number of nodes at runtime.

For example, if a node is configured with relatively low numbers of steady-state and non-steady-state jobs, then the node may not fully utilize its system resources at runtime. To exacerbate this problem, in order for the virtual computer cluster to be able to handle relatively large overall total numbers of steady-state and non-steady-state jobs, the minimum total number of nodes and the maximum total number of nodes may have to be set to relatively high numbers for performance reasons and thus may cause some even most of the nodes underutilized at runtime most of the time.

In contrast, techniques as described herein can be applied to dynamically scale a virtual computer cluster to an appropriate level, in accordance with any mix of steady-state and/or non-steady-state jobs being currently processed by the virtual computer cluster, to ensure relatively high or normal performance with minimized costs for computing resources. These techniques can be used to efficiently and effectively scale or extend streamers to support an increasing number of platform and add-on services and service features offered to or subscribed by a large number of organizations hosted in the multitenant computing system.

The virtual computer cluster may be used to process different dynamic mixes of steady-state and/or non-steady-state jobs at different time points. The steady-state jobs may include streaming jobs that do not have end times (or that have a very long job duration such as years or months or weeks rather than hours or even days) and/or that have a relatively steady (e.g., smooth, constantly or regularly recurring, etc.) flow of messages.

The non-steady state jobs may include non-streaming jobs such as day 0 jobs that have end times (e.g., hours, or days, etc.) and/or that emit messages with relatively high burstiness within time constraints. As used herein, a day 0 job may refer to a non-steady-state job that only runs once per organization (e.g., initially to enable a service or service features for an organization, etc.). It should be noted that day 0 jobs are used here as only one example of a non-streaming job type (or a non-steady-state job type) that can cause a virtual computer cluster to perform relatively large numbers of data processing operations in a relatively short time duration.

The total number of nodes in the virtual computer cluster can be dynamically scaled or sized (e.g., in real time, in near real time, with scheduling, etc.) for processing the different mixes of jobs at the different times.

Each node in the virtual computer cluster, as started with a cloud-based computing service, can receive/process messages (e.g., in the form of data files, etc.) from jobs of all steady-state or non-steady-state jobs. Messages in connection with non-steady-state jobs such as sporadic, heavy duty, bursty, and/or non-streaming jobs can be processed by a node in the virtual computer cluster while messages in connection with steady-state jobs such as relatively constant, relatively smooth, and/or streaming jobs are being processed by the same node.

When the total number of messages to be processed varies over time (e.g., one or more units of time, 20000 seconds, 5000 seconds, 30000 seconds, a unit of measurement time, etc.), the total number of nodes in the virtual computer cluster can be automatically scaled up and down. To handle message bursts, additional nodes can be started with the cloud-based computing service. On the other hand, to handle message flows that are at relatively normal or low levels, one or more nodes in the virtual computer cluster can be terminated via interactions with the cloud-based computing service.

For example, an initial number of nodes of the same type can be deployed in the virtual computer cluster with the cloud computing service to receive/process messages, regardless of whether these messages are related to streaming jobs or non-streaming jobs, or steady-state jobs or non-steady-state jobs. Each node in the virtual computer cluster can measure the total number of messages processed by each such node over a set time interval. The node can be compared the total number of messages with a maximum total message number threshold and a minimum total message number threshold. If the total number of messages processed over the set time interval exceeds the maximum total message number threshold, the node can cause the cloud computing service to start a new node to join the virtual computer cluster. If the total number of messages processed over the set time interval falls below the minimum total message number threshold, the node can cause the cloud computing service to terminate itself unless the node is the last node in the virtual computer cluster, or a designated node (e.g., a master node, etc.) to stay alive in the virtual computer cluster.

Techniques as described herein can be used to dynamically scale and size virtual computer clusters to process or stream large numbers of messages with relatively fewer numbers of nodes and/or node resources that are to be provisioned by cloud computing services. These techniques also isolate long running large message volume jobs from adversely impacting steady state message streaming for services that are already provisioned to organizations hosted in the multitenant computing system and/or for services that are already in steady states. This ensures that relatively good performances of these services to these organizations can be achieved and maintained, even in operational scenarios in which a large number of service activations or provisioning requests in connection with newly subscribing organizations are being processed.

Additionally, optionally or alternatively, techniques as described herein can be implemented to operate in conjunction with, or in place of, other virtual computer cluster scaling techniques. Example other virtual computer cluster scaling techniques can be found in U.S. patent application Ser. No. 15/994,126, with an application title of "CONTROL MESSAGE FROM STREAMING SOURCE TO FACILITATE SCALING" by Yogesh Patel, William Victor Gray, William Hackett, Shaahin Mehdinezhad Rushan, Johannes Kienzle, Shreedhar Sundaram, Mahalaxmi Sanathkumar, Rajkumar Pellakuru, Bhaves Patel and Bertha Ching Wai Lam, filed on May 31, 2018, the entire contents of which are hereby incorporated by reference as if fully set forth herein.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1 illustrates an example overall cloud-based framework 100 for processing messages between a first computing system and one or more second computing systems. Examples of a computing system as described herein may include, but are not necessarily limited to: any of: a large-scale cloud-based computing system, a system with multiple data centers, multitenant data service systems, web-based systems, systems that support massive volumes of concurrent and/or sequential transactions and interactions, database systems, an artificial intelligence (AI) based computing system, a service support system, a service provider system, an organization-specific external system, and so forth. Various system constituents may be implemented through software, hardware, or a combination of software and hardware. Any, some or all of these system constituents may be interconnected and communicated directly, or through one or more networks 120.

By way of example but not limitation, the first computing system in the message processing framework (100) as shown in FIG. 1 represents a cloud-based multitenant computing system, whereas the one or more second computing systems in the message processing framework (100) as shown in FIG. 1 represent one or more external computing systems 108 located outside (or external to) the cloud-based multitenant computing system.

The multitenant computing system may host a large number (e.g., millions, etc.) of organizations at a plurality of data centers such as 112-1, 112-2, 112-3, etc. Some or all of these data centers may be located at the same or different geographic locations such as the same or different continents, the same or different countries, the same or different states, the same or different regions, and so forth.

Each data center may implement a set of system instances to host respective organizations. These organizations may contract with the owner of the multitenant computing system to host their respective (e.g., organization-specific, organization-common, etc.) application data, to provide their (e.g., organization-specific, organization-common, etc.) application services to their respective users and/or customers, and so forth. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1, each data center (e.g., 112-1, 112-2, 112-3, etc.) may comprise a set of one or more system instances. A first data center 112-1 comprises first system instances 110-1-1, 110-1-2, etc.; a second data center 112-2 comprises second system instances 110-2-1, 110-2-2, etc.; a third data center 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1, the system instance (110-1-1) in the data center (112-1) may host a first organization 114-1 and a second organization 114-2, among others; the system instance (110-1-1) in the data center (112-1) may host a third organization 114-3, among others.

Techniques as described herein can be implemented in the message processing framework (100) to provide a cloud-based streamer capable of ingesting, transforming and/or forwarding a large amount of data (including but not limited to realtime or non-realtime data for organizations and metrics generated for the organizations) and/or receiving/sending a large number of messages encapsulating some or all of the data between different computing systems. As used herein, the term "streamer" may refer to a cloud-based streaming application—which is implemented at least in part by a virtual cluster of computer instances (or a virtual computer cluster) started by a cloud computing service— that can process or stream the messages from one computing system to another computing system over the networks (120), from one subsystem of a computing system to another subsystem of the computing system, and so forth. For example, the streamer may process or stream messages between a first computing system (or a subsystem therein) located on a private cloud and a second computing system (or a subsystem therein) located on a public cloud. A streamer or streaming application may also be referred to as data pipeline(s), built to stream data from one end to another end over one or more networks, and may be implemented with a cloud computing service (e.g., AWS, etc.) as a elastic bean instance.

In some embodiments, one or more streamers (or streaming applications) implemented by one or more virtual computer clusters 102 in the networks (120) can be used to exchange a large amount of data (and a large number of messages) between a multitenant computing system comprising the data centers and the system instances as illustrated in FIG. 1 and the external computing systems (108) as illustrated in FIG. 1.

For example, platform data generated (e.g., by triggers, in real time, in near real time, etc.) or maintained (e.g., stored in data repositories, etc.) by the multitenant computing system for one or more hosted organizations may be encapsulated or carried in platform-originated messages. The platform-originated messages may be sent from the multitenant computing system to a streamer implemented by a virtual computer cluster among the virtual computer clusters (102). The streamer may forward these platform-originated messages to an external computing system among the external computing systems (108). Additionally, optionally or alternatively, the streamer may use the platform-originated messages to generate external-system-bound messages that encapsulate or carry some or all of the platform data for the organizations and send the external-system-bound messages to an external computing system among the external computing systems (108).

The external computing system derives metrics (e.g., machine learned information, etc.) for the organizations based at least in part on the platform data and pushes back some or all of the derived metrics in messages streamed from the external system to the streamer, and then to the multitenant computing system. Example metrics derived for the organizations may include, but are not necessarily limited to, any of: the time of the last call made to a specific customer by an account manager at an organization, the number of activities/events carried out over the last measuring time period (e.g., the last month, the last quarter, etc.) to interact with customers by an organization (e.g., a specific department therein, a specific user thereof, etc.), etc. External system generated data such as the derived metrics can be used by the multitenant computing system to enhance user experiences and services.

The platform data and the external-system-generated data exchanged between the multitenant computing system and the external computing systems (108) by way of the streamer (or streaming application) deployed in the networks (120) with a cloud computing system may include, but is not necessarily limited to only, any of: platform data maintained or generated by the multitenant computing system and sent by the multitenant computing system to an external computing system as described herein, external data maintained or generated by an external computing system as described herein and sent by the external computing system to the multitenant computing system, and so forth.

The platform data and the external-system-generated data exchanged between the multitenant computing system and the external computing systems (108) may comprise specific data portions related to (or associated with) one or more specific standard and/or add-on services (e.g., services that may be provided by the multitenant computing system operating in conjunction with one or more external computing systems, etc.) provided to the organizations hosted in the multitenant computing system. A service as described herein may be offered (to a subscriber or organization of the platform service) by the multitenant computing system operating in conjunction with one or more external computing systems such as 108 of FIG. 1.

In a non-limiting implementation example, the external computing system in the external computing systems (108) comprises machine learning (ML) or artificial intelligence (AI) based tools that scan or consume data from a variety of sources or of a variety of different data types—including but not limited to platform data relating to the organizations from data stores and/or ongoing transactions/operations in the multitenant computing system—to generate the metrics, for example in the form of actionable recommendations/suggestions, etc., to be used by the multitenant computing system to provide the specific services or specific features/functions thereof. Some or all of such specific services and service features may be accessed or used by users through a plurality of user devices 118.

Under techniques as described herein, nodes (or computer instances) in the virtual computer clusters (102) may be started, for example in the networks (120), with one or more cloud computing services such as Amazon Web Services or AWS, Microsoft Azure Cloud, etc. These nodes, which are configured with virtual hardware and software resources, appear virtually to be fully functioning (e.g., general-purpose, special-purpose, etc.) computers or computer instances to a subscriber to the cloud computing services such as the owner or operator of the multitenant computing system and the external computing systems (108). These nodes can be used to implement streamers to ingest, transform and/or forward some or all of the messages originated from or destined to the multitenant computing system (e.g., one or more data centers therein, one or more system instances in one or more data centers therein, etc.) and/or the external computing systems (108).

Each virtual computer cluster as described herein may implement one or more streamers to ingest, transform and/or forward messages in connection with a combination of one or more of: one or more specific data centers in the multitenant computing system, one or more specific system instances in a specific data center, one or more organizations hosted in a specific system instance in a specific data center, a specific external computing system, a specific platform and/or add-on service implemented by the multitenant computing system operating in conjunction with an external computing system, a specific time period, etc.

2.1 System Configuration

Figure 2A:
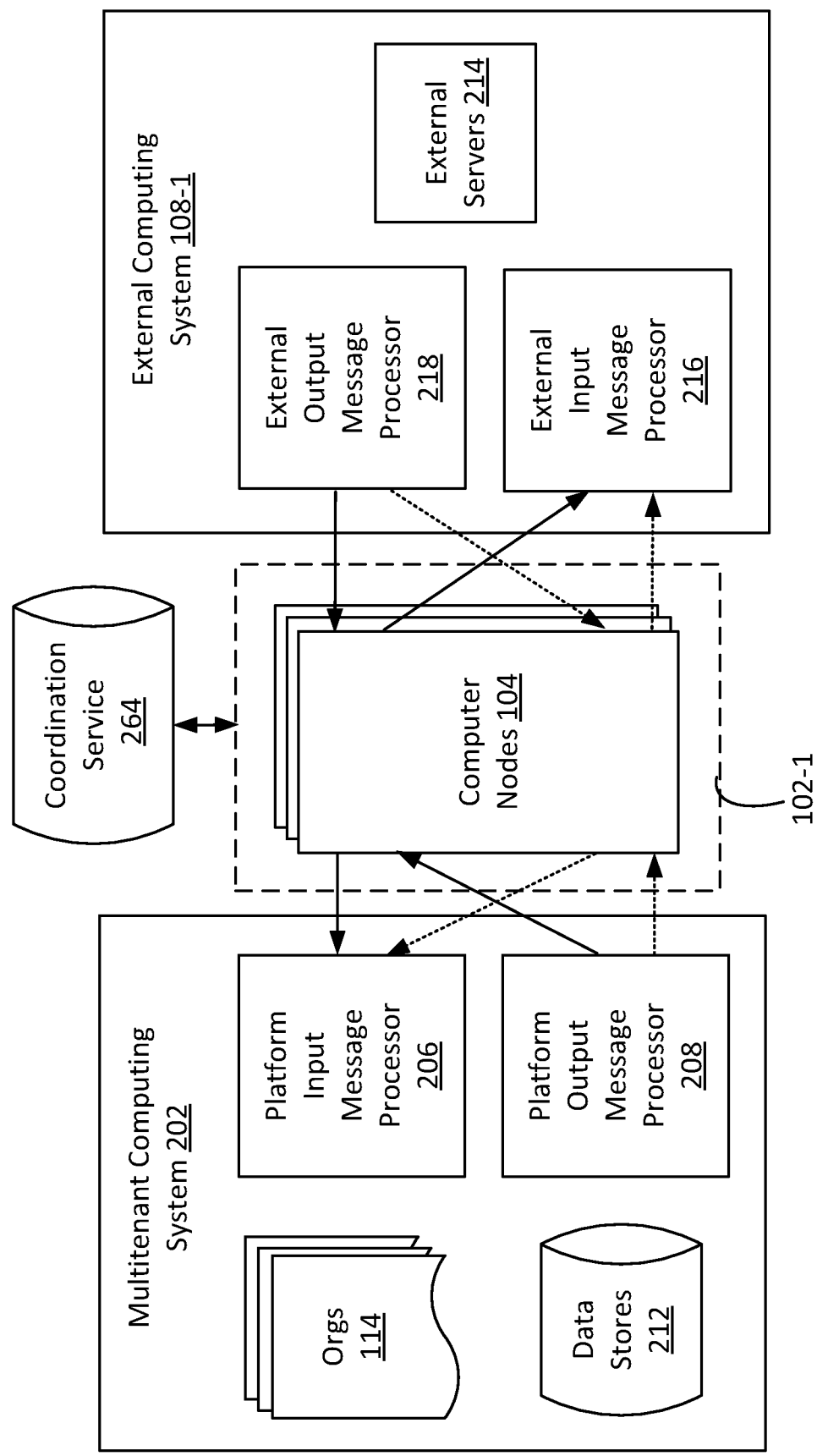
FIG. 2A and FIG. 2C illustrate example system configurations in which a virtual computer cluster mediating platform-data and external messages between a multitenant computer system and an external computing system.

FIG. 2A illustrates an example system configuration in which a virtual computer cluster (e.g., 102-1, etc.) mediating platform-data and external messages between a multitenant computer system 202 and an external computing system 108-1. Any of the system components as depicted in FIG. 2A may be implemented with one or more computing devices using software, hardware, a combination of software and hardware, etc.

A plurality of organizations 114 may be hosted on one or more system instances (e.g., in one or more data centers, etc.) in the multitenant computing system (202), which may be a distributed system (as illustrated in FIG. 1) comprising a number of data centers and system instances in each of the data centers. Application data for some or all of the organizations—which may include but is not necessarily limited to only, any of: organization-specific application data, organization-common application data, application configuration data, application data, application metadata, application code, etc., specifically generated or configured for (e.g., organization-specific, organization-common, etc.) application services of an individual organization, data used in providing one or more specific platform and/or add-on services, data generated from one or more specific platform and/or add-on services—may be stored in one or more data stores 212.

The multitenant computing system (202) includes a platform input message processor 206 for receiving and/or processing platform-bound incoming messages from the virtual computer cluster (102-1) to the multitenant computing system (202), as well as a platform output message processor 208 for processing and/or sending platform-originated outgoing messages from the multitenant computing system (202) to the virtual computer cluster (102-1). Additionally, optionally or alternatively, the multitenant computing system (202) may include a plurality of application and/or platform servers to interact with external computing systems (e.g., 108 of FIG. 1, 108-1 of FIG. 2A, etc.), to perform database operations with respect to the one or more data stores (212), to interact with user devices (e.g., 118 of FIG. 1, etc.), to provide organization-specific and/or organization-common application services to users/customers of some or all of the organizations (114), and so forth.

The external computing system (108-1) includes an external input message processor 216 for receiving and/or processing external-system-bound incoming messages from the virtual computer cluster (102-1) to the external computing system (108-1), as well as an external output message processor 218 for processing and/or sending external-system-originated outgoing messages from the external computing system (108-1) to the virtual computer cluster (102-1). Additionally, optionally or alternatively, the external computing system (108-1) may include a plurality of external servers to interact with the multitenant computing system (202), to perform some or all of ML processing operations, AI processing operations, service-specific operations, service-specific business logic, and so forth.

In a non-limiting example, the external computing system (108-1) may be a system—outside the multitenant computing system (202)—implementing a relationship intelligence platform that combines data from email systems, smartphone calls, appointments, social network messages (e.g., Twitter messages, etc.), social network chats, and so forth to provide augmented and/or additional features to standard platform services (or tools). The external computing system (108-1) may use ML or AI based tools to scan or search diverse data such as email information, calendar information and other data points; to run predictive analytics over the collected information (e.g., email accounts, calendar entries, platform data sourced from the multitenant computing system (202), etc.); to generate actionable information (e.g., recommendations, suggestions, reminders, etc.) on an ongoing basis; to inform users and/or customers of a hosted organization that subscribes to these augmented and/or additional features with the actionable information; and so forth.

The virtual computer cluster (102-1), or any node therein, may collect messages from one or both of the multitenant computing system (202) and the external computing system (108-1) using one or more data collection methods among a wide variety of data collection methods. Any, some or all of these data collection methods may be implemented based at least in part on one or more of: Spark Streaming, Kafka, Storm Topology, SOAP, Enterprise Message Platforms (EMP), S3, Cassandra, Flume, Amazon Kinesis, Spark SQL, Amazon Redshift, Amazon RDS, and so forth. In some embodiments, the virtual computer cluster (102-1) may use the same message communication mechanism(s) such as Kafka in an end-to-end message pipeline (e.g., one way, both ways, etc.) to communicate with both of the multitenant computing system (202) and the external computing system (108-1). In some embodiments, the virtual computer cluster (102-1) may use different message communication mechanisms such as two or more of Kafka, Cassandra, SOAP, etc., in an end-to-end message pipeline (e.g., one way, both ways, etc.) to communicate with the multitenant computing system (202) and the external computing system (108-1).

In a non-limiting implementation example, organization data retrieved from the data stores (212) or captured in real time or in near real time by transaction observers (TXOs) may be encapsulated or carried in messages (e.g., of streaming jobs, etc.). These platform-originated messages may be enqueued or pushed into one or more first Kafka queues. The virtual computer cluster (102-1), or a node (e.g., a computer node 104-1 of FIG. 2B, etc.) therein, can dequeue or read these platform-originated messages from the first Kafka queues, generates corresponding external-system-bound messages to encapsulate or carry the retrieved organization data. The external-system-bound messages may be enqueued or pushed into one or more second Kafka queues. The external computing system (108-1), or the external input message processor (214) therein, can dequeue or read the external-system-bound messages from the second Kafka queues. Some or all of the retrieved organization data may be used (possibly along with other data collected from other data sources) by the external computing system (108-1) to generate metrics for the organization (114-1).

The metrics generated by the external computing system (108-1) for the organization (114-1) (possibly along with metrics generated for other organizations hosted in the multitenant computing system (202)) may be stored in one or more S3 databases accessible by the virtual computer cluster (102-1). A node (e.g., the computer node (104-1) of FIG. 2B, etc.) in the virtual computer cluster (102-1) may retrieve or pull the stored metrics for the organization (114-1), generate platform-bound messages to encapsulate or carry some or all of the metrics generated by the external computing system (108-1) for the organization (114-1), and enqueue or push these platform-bound messages to one or more third Kafka queues. The multitenant computing system (202) can dequeue or read these messages from the third Kafka queues, and store some or all of the metrics in the data stores (212) with other organization data for the organization (114-1).

In some embodiments, some or all of Kafka queues, any file system used for performance improvement, and so forth, may be implemented outside the virtual computer cluster (102-1). In some embodiments, intermediate data generated by a node (e.g., the computer node (104-1) of FIG. 2B, etc.) in the virtual computer cluster (102-1) such as transformed data by the node can be stored in a database or file system such as S3 that is external to the virtual computer cluster (102-1). These transformed data may be retrieved by the same or a different node in the virtual computer cluster (102-1) for writeback to either the multitenant computing system (202) and/or the external computing system (108-1).

Like other virtual computer clusters in the virtual computer clusters (102), the virtual computer cluster (102-1) as illustrated in FIG. 2A may comprise a dynamic set of virtual computers (e.g., Amazon EC2 instances, etc.) to process or stream messages related to a specific external computing system among the external computing systems (108). As previously noted, each node (or virtual computer) in the virtual computer cluster (102-1) may be a (virtual) computer (or an instance of computer) with a specific configuration of CPU, memory, data storage, network interfaces, etc., as provided by the cloud computing service. Each virtual computer can be loaded or installed with system software such as some or all of: (e.g., general, real time, customized, etc.) OS, network communications stacks, cloud-based database interfaces, cloud-based file system interfaces, cloud-based message interfaces, etc., as well as application software such as some or all of: authentication and/or authorization software, message processing and/or streaming software, message filtering and/or transformation software, database related software, network related software, file system related software, etc.

In contrast with a physical computer deployed on premises, a virtual computer (e.g., a virtual computer, a node, a virtual computer instance, etc.) in the virtual computer cluster (102-1) can be made available to a subscriber of a cloud computing service as described herein in the networks (120) at a scheduled time or immediately, for example through message-based or API-based interactions between the subscriber and the cloud computing service in real time or in near real time. Some or all of system software and/or application software can be loaded or installed on demand, responsive to events, in real time, in response to determining that the computer is provisioned and started online by the cloud computing service, etc. The loading and installation of the system and/or application software can be effectuated and/or coordinated through message-based or API-based system load operations on the just started computer in the virtual computer cluster (102-1) without needing to physically operate a computer on premises.

The virtual computer cluster (102-1) may, at a first time point, comprise a set of computer nodes 104 (e.g., one of which may be 104-1 of FIG. 2B, etc.) each of which is a virtual computer tasked to process or stream messages between the minimum total message number threshold and the maximum total message number threshold. The set of computer nodes (104) may be used to process or stream messages that are to be emitted or consumed by steady-state and non-steady-state jobs after the first time point. Thus, at the first time point, the set of computer nodes (104) may constitute the entirety of the dynamic set of virtual computers in the virtual computer cluster (102-1).

As used herein, the term "job" may refer to a computer implemented unit of work that causes a set of related messages to be exchanged between the multitenant computing system and an external computing system. More specifically, the term "steady-state job" or "streaming job" may refer to a computer implemented unit of work that causes a set of related messages to be exchanged between the multitenant computing system and an external computing system (e.g., in a steady state, in a streaming state, messages to stream data generated in real time or in near real time, etc.) on an ongoing basis without an end in time (e.g., so long as the organization remains a subscriber to a service with which the messages are related, etc.). The term "non-steady-state job" or "non-streaming job" may refer to a computer implemented unit of work that causes a set of related messages to be exchanged between the multitenant computing system and an external computing system (e.g., in a non-steady state, in a non-streaming state, etc.) with a start and an end (which may or may not be very long running) in time. An example non-streaming job may, but is not limited to, be a day 0 (or day zero) job that starts off a subscription of a service, a job that is sporadically performed, one-off initial data extraction and transfer from the multitenant computing system to an external computing system when an organization just starts a service subscription, etc. In some embodiments, a job that emits bursts (e.g., batches, a large number in a relatively short period of time, etc.) of messages repetitively may be considered as a non-streaming job. In some embodiments, a job that emits a relatively steady flow (e.g., in between an upper limit and a non-zero lower limit, above a non-zero limit, etc.) of messages per unit time (e.g., every three minutes, every time interval, every hour, every day, every week, every month, every quarter, every work day, every business hour, etc.) may be considered as a streaming job.

The dynamic set of virtual computers in the virtual computer cluster (102-1) may comprise a changing number of virtual computers or nodes at one or more second time points subsequent to the first time point, depending on the total number of messages processed by the dynamic set of virtual computers as measured in set time intervals at or near the one or more second time points. The set of (e.g., one or more, etc.) computer nodes (104) in the dynamic set of virtual computers can be used to process steady-state messages (e.g., messages to carry data generated by online transactions or operations in real time or in near real time, etc.) as well as non-steady-state (e.g., bursty, in highly varying message flows, sporadic, etc.) messages.

Thus, when the message processing/streaming workload is relatively low, the set of computer nodes (104) may be (e.g., automatically, manually, mostly automatically with light human supervision, etc.) scaled to a relatively low number (e.g., 1, 2, etc.) of computer nodes. On the other hand, when the message processing/streaming workload increases, the set of computer nodes (104) may be (e.g., automatically, manually, mostly automatically with light human supervision, etc.) scaled up to a relatively high number of computer nodes.

2.2 Node Configurations

Figure 2B:
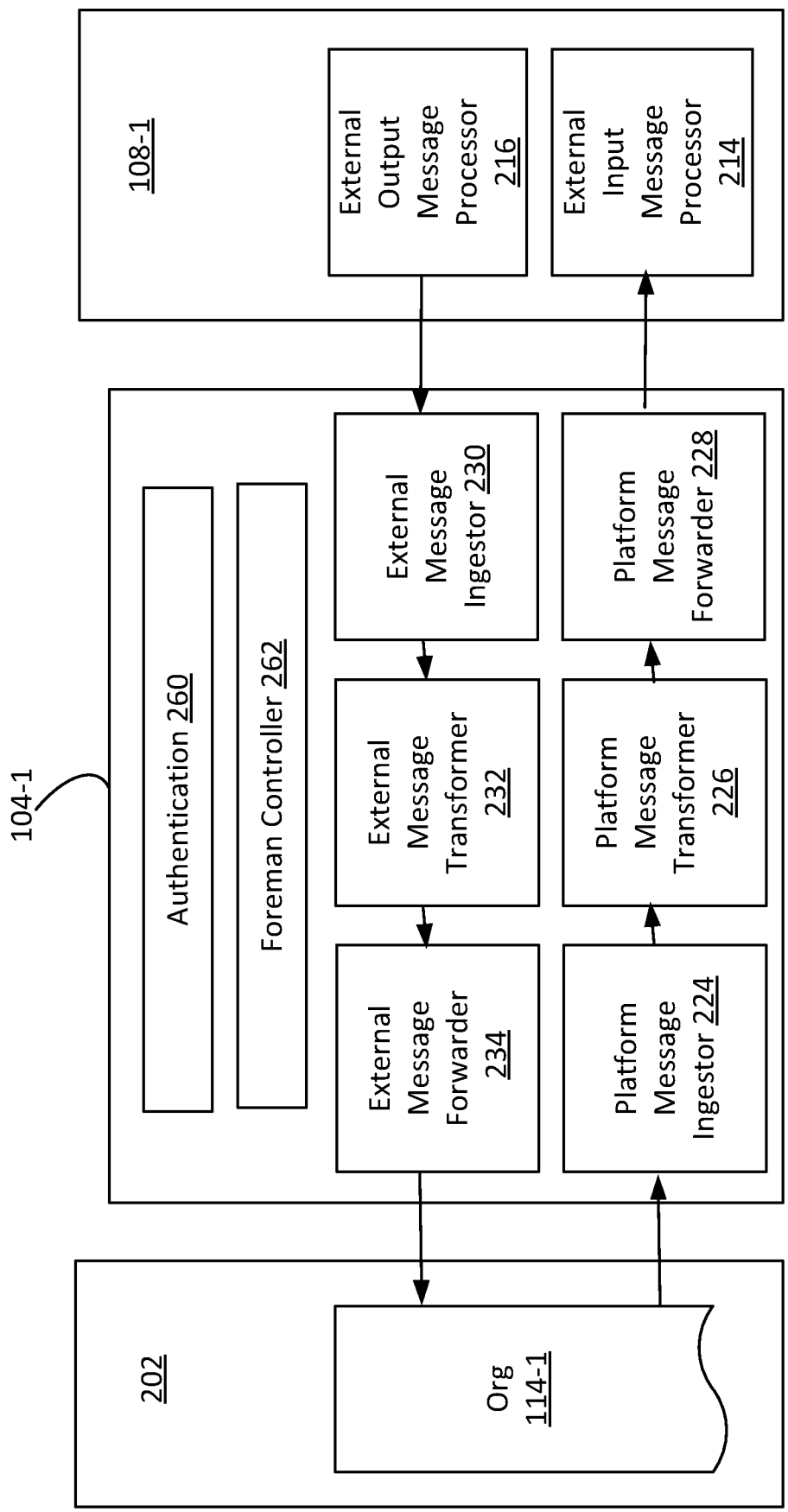
FIG. 2B illustrates an example computer node.

FIG. 2B illustrates an example computer node 104-1 that may be (e.g., at a given time, initially, at a later time, etc.) started as a part of the virtual computer cluster (102-1). Like other nodes in the virtual computer cluster (102-1), each of the computer node (104-1) may not be a physical computer (e.g., a computer on premises, etc.), but rather is a (virtual) computer or computer instance started in a network cloud (e.g., the networks (120) of FIG. 1, etc.) by a cloud computing service.

A subscriber of the cloud computing service may interact with the cloud computing service using web-based protocols such as HTTPS-based web messages, etc., in real time or near real time to carry out a variety of cluster management operations including but not necessarily limited to only any of: starting a new node (e.g., computer, computer instance, etc.) in the virtual computer cluster (102-1); shutting down an existing node (e.g., computer, computer instance, etc.) in the virtual computer cluster (102-1); logging to (e.g., via HTTPS based interactions, etc.) any node (e.g., computer, computer instance, etc.) in the virtual computer cluster (102-1); installing general and/or specific computer applications on a node so long as these applications are supported by an operation system installed on the node (e.g., computer, computer instance, etc.) in the virtual computer cluster (102-1); performing system configuration operations and/or application configuration operations on any node (e.g., computer, computer instance, etc.) in the virtual computer cluster (102-1); tasking or deploying a node (e.g., computer, computer instance, etc.) in the virtual computer cluster (102-1) to perform computer-implemented operations such as processing or streaming messages as described herein; starting and configuring a computer node in the virtual computer cluster (102-1) to process or stream messages of any combination of specific streaming jobs and/or specific organizations hosted in the multitenant computing system (202) and/or specific external computing systems (e.g., any of 108 of FIG. 1, etc.) and/or specific platform and/or services and/or specific features of one or more specific platform and/or services; starting and configuring a non-computer node in the virtual computer cluster (102-1) to process messages of any combination of specific non-streaming jobs and/or specific organizations hosted in the multitenant computing system (202) and/or specific external computing systems (e.g., any of 108 of FIG. 1, etc.) and/or specific platform and/or services and/or specific features of one or more specific platform and/or services; and so forth.

For example, in a non-limiting example, as a part of starting up the computer node (104-1) as illustrated in FIG. 2B, specific application packages/software implementing an authentication subsystem 260, a foreman controller 262, an external message forwarder 234, an external message transformer 232, an external message ingestor 230, a platform message forwarder 228, a platform message transformer 226, a platform message ingestor 224, etc., may be installed and activated on the computer node (104-1). Any of these components (or subsystems) in the computer node (104-1) may be implemented in software, hardware, a combination of software and hardware, etc.

As the multitenant computing system (202), the external system (108-1) and the virtual computer cluster (102-1) (or the streamer) reside in different parts (e.g., private cloud, public cloud, different geographic regions, access networks, core networks, transport networks, carrier networks, content delivery networks, on premises, etc.) of an overall network cloud, some or all nodes (e.g., computer nodes such as 104-1, etc.) in the virtual computer cluster (102-1) can exchange respective user and/or system credentials (e.g., authentication information, authorization information, etc.) with communication counterparts such as the multitenant computing system (202) and the external system (108-1) to successfully authenticate the nodes by the communication counterparts, to successfully authenticate the communication counterparts by the nodes, to successfully authorize the nodes for data access to data/messages provided by the communication counterparts, to successfully authorize the communication counterparts for data access to data/messages provided by the nodes, and so forth.

By way of illustration but not limitation, the authentication subsystem (260) in the computer node (104-1) as illustrated in FIG. 2B may be implemented to carry out some or all of the foregoing authentication operations and/or authorization operations for the computer node (104-1) and/or for another node in the virtual computer cluster (102-1).

For example, the computer node (104-1) may spawn off, or cause the cloud computing service to start, a new computer node for helping process a detected heavy workload. In some embodiments, the new computer node may (e.g., automatically, without additional authentication and/or authorization operations, etc.) inherit data access/sharing rights granted to the computer node (104-1) by the multitenant computing system (202) and/or the external computing system (108-1); the non-computer node (106-1) may (e.g., automatically, without additional authentication and/or authorization operations, etc.) grant the same or similar data access/sharing rights—as those granted by the computer node (104-1) to the multitenant computing system (202) and/or the external computing system (108-1)—to the multitenant computing system (202) and/or the external computing system (108-1).

Each computer node (e.g., 104-1, etc.) in the virtual computer cluster (102-1) keeps track of the total number of messages processed by each such node in a given time frequency or time interval. Based on the total number of messages processed as measured in the time frequency or time interval, each such node can (e.g., independently, cooperatively, etc.) take actions such as scaling up or scaling down the total number of computer nodes in the virtual computer cluster (102-1). Each computer node in the virtual computer cluster (102-1) is implemented with capabilities of instantiating another node in the virtual computer cluster (102-1), rather than depending upon autoscaling functions from the cloud computer service. Thus, regardless of whether the virtual computer cluster (102-1) implements a master-slave model or a peer-to-peer model, a node in the virtual computer cluster (102-1) can operate independently, without going through any other node such as a master node in the virtual computer cluster (102-1), to cause a new node to start in the virtual computer cluster (102-1) or tear down the node itself.

In some embodiments, as illustrated in FIG. 2A, streaming and non-streaming jobs messages of which are to be processed by the virtual computer cluster (102-1) may be represented as data entries (e.g., comprising data file names comprising messages to be processed, message set identifiers identifying sets of messages to be processed, etc.) in a data structures (e.g., a coordination service 264, a memory structure, etc.).

In some embodiments, the foreman controller (262) in the computer node (104-1) of FIG. 2B may read a node configuration file to determine how frequent (e.g., every 5000 seconds, every 10000 seconds, every 20000 seconds, every 30000 seconds, etc.) the computer node (104-1) is to look for new jobs (e.g., new sets of messages, new data files comprising new sets of messages, etc.) to be processed. An example node configuration file for a computer node as described herein may define capacity of the computer node in terms of number of message streamed or processed (e.g., instead of job type or CPU usage, etc.), as illustrated in TABLE 1 below.

TABLE 1

```
NodeCapacity:
MessageCountUpperBound: 30000 // Steady-state and non-steady-state messages
MessageCountLowerBound: 5000 // Steady-state and non-steady-state messages
Frequency: 600 // in seconds; time frequency or time interval
day0Foreman:
capacity: 5        // a striking line over this line "capacity: 5" has been removed to be
                   // in compliance with the USPTO rules; this line is to be struck
                   // out from this example node configuration file
jobType:"day0"
streamForeman:
capacity: 4        // a striking line over this line "capacity: 4" has been removed to be
                   // in compliance with the USPTO rules; this line is to be struck
                   // out from this example node configuration file
jobType: "stream"
isMasterNode: TRUE // OR FALSE, can teardown itself
```

2.3 Message Processing

Techniques as described herein can be applied to process or stream messages between a multitenant computing system (e.g., 202 of FIG. 2A, etc.) and an external computing system (e.g., 108-1 of FIG. 2A, etc.) to provide a specific service (e.g., a standard platform service, an enhanced platform service, an add-on service, etc.), or specific features (e.g., features of a newly provided service, newly released features, enhanced features of an existing services, etc.) thereof, to an organization (e.g., a subscriber of the specific service, a subscriber of the specific features, etc.) hosted in the multitenant computing system (202).

To provide the specific service, or the specific features thereof, platform data maintained or generated for the organization by the multitenant computing system (202) may be retrieved from the data stores (212) by platform processing entities operating in conjunction with the platform output message processor (208). The retrieved platform data may comprise stored application data from committed transactions as well as real-time or near-real-time data collected by TXOs from ongoing transactions (e.g., inflight transactions, through triggers specified before at and/or after a transaction, etc.) that may or may not be fully committed. In some embodiments, the TXOs are used to monitor every transaction in some or all transactions (e.g., in connection with the organization, etc.) that are performed by the multitenant computing system (202). Triggers (or hooks) can be placed before, at, and/or after commit a transaction. Messages (e.g., steady-state messages) may be generated based on data insertion, deletion, and/or update that occur in a monitored transaction and transmitted through the virtual computer cluster (102-1), or a computer node (e.g., 104-1, etc.) to the external computing system (108-1) under the pipeline.

The retrieved platform data for the organization may be provided to the platform output message processor (208) through internal data connections/paths in the multitenant computing system (202) and transformed by the platform output message processor (208) into platform-originated outgoing messages in one or more specific data formats (including but not limited to data file formats, data message formats, etc.) supported by the multitenant computing system (202) and the virtual computer cluster (102-1). Example supported data formats may include, but are not necessarily limited to only, any of: any data format supported on EMP, any data format supported by one or more specific messaging APIs such as Kafka, Simple Object Access Protocol (SOAP) APIs, JSON, etc.

These platform-originated outgoing messages encapsulating the retrieved platform data (e.g., carried in payloads of the messages, carried in a data file, carried in a comma separated file, etc.) for the organization may be sent by the multitenant computing system (202), or the platform output message processor (208) therein, to the virtual computer cluster (102-1), or one or more nodes therein.

In some embodiments, the platform-originated outgoing messages may comprise steady-state messages as well as non-steady-state messages. The non-steady-state messages may include, but are not necessarily limited to only, those messages from an initial non-steady-state job that occurs (e.g., only once, only twice, sporadically, etc.) to enable a newly subscribed service or newly subscribed features of an existing service.

Some or all of the platform-originated messages sent by the multitenant computing system (202) by way of the platform output message processor (208) can be received and processed by the computer nodes in the set of computer nodes (104) or platform message ingestors (e.g., 224 of FIG. 2B, etc.) therein. In some embodiments, the received platform-originated messages can be repackaged by the computer nodes in the set of computer nodes (104) into external-system-bound messages directly by inserting, replacing and/or deleting some message header values. In some embodiments, the received platform-originated messages can be manipulated/transformed (e.g., filtered, aggregated, with message format conversion, with data extraction, with data manipulation, with data filtering, with data aggregation, etc.) by the computer nodes in the set of computer nodes (104) or platform message transformers (e.g., 226 of FIG. 2B, etc.) therein into external-system-bound messages. The external-system-bound messages can be formatted in one or more specific data formats (including but not limited to data file formats, data message formats, etc.) supported by the external computing system (108-1) and the virtual computer cluster (102-1). Example supported data formats may include, but are not necessarily limited to only, any of: comma separated files (CSFs), any data format supported by Kafka-based streaming operations, any data format supported by Spark streaming operations, etc.

The external-system-bound messages encapsulating or carrying some or all of the retrieved data (including but not limited to any attendant data as derived by the computer nodes in the set of computer nodes (104)) for the organization from the data stores (212) of the multitenant computing system (202) can then be sent from the computer nodes in the set of computer nodes (104) in the virtual computer cluster (102-1), or platform message forwarders (e.g., 228 of FIG. 2B, etc.) therein, to the external computing system (108-1).

Some or all of the external-system-bound messages can be received by the external computing system (108-1), or an external input message processor 216 therein. These received external-system-bound messages encapsulates some or all of the retrieved data for the organization from the multitenant computing system (202) or the data stores (212) therein. The retrieved platform data for the organization may be extracted from the received messages by the external input message processor (216) and then provided to, or shared with, other data processing entities such as one or more external servers 214 in or operating in conjunction with the external computing system (108-1) through (e.g., internal, external, etc.) data connections/paths. The retrieved platform data for the organization and other data resident in the external computing system (108-1) or collected from other data sources (e.g., Twitter messages, LinkedIn information, social network messages, social network chats, email accounts, calendars, etc.) may be processed by the external servers to generate (e.g., service-specific, value-added, data used to drive service logic, etc.) external-system-originated data for the organization to be used for providing the specific service, or the specific features thereof, to the organization.

The external-system-originated data for the organization may be provided by the external servers (214) to an external output message processor 218 through (e.g., internal, external, etc.) data connections/paths in the external computing system (108-1) and transformed by the external output message processor (218) into external-system-originated outgoing messages can be formatted in one or more specific data formats (including but not limited to data file formats, data message formats, etc.) supported by the external computing system (108-1) and the virtual computer cluster (102-1). Example supported data formats may include, but are not necessarily limited to only, any of: comma separated files (CSFs), any data format supported by Kafka-based streaming operations, any data format supported by Spark streaming operations, etc.

These external-system-originated outgoing messages encapsulating the external-system-originated data for the organization may be sent by the external computing system (108-1) or the external output message processor (218) therein to the virtual computer cluster (102-1).

Some or all of the external-system-originated messages can be received by the one or more computer nodes in the set of computer nodes (104) in the virtual computer cluster (102-1), or external message ingestors (e.g., 230 of FIG. 2B, etc.) therein. In some embodiments, these messages can be repackaged by the computer nodes in the set of computer nodes (104) into platform-bound messages directly by replacing some message header values. In some embodiments, the external-system-originated messages can be manipulated/transformed (e.g., filtered, aggregated, with message format conversion, with data extraction, with data manipulation, with data filtering, with data aggregation, etc.) by the computer nodes in the set of computer nodes (104), or external message transformers (e.g., 232 of FIG. 2B, etc.) therein, into platform-bound messages. The external-system-bound messages can be formatted in one or more specific data formats (including but not limited to data file formats, data message formats, etc.) supported by the multitenant computing system (202) and the virtual computer cluster (102-1). Example supported data formats may include, but are not necessarily limited to only, any of: any data format supported on EMP, any data format supported by one or more specific messaging APIs such as Simple Object Access Protocol (SOAP) APIs, JSON, etc.

The external-system-bound messages carrying some or all of the external-system-originated data (including any derived data as derived by the computer nodes in the set of computer nodes (104)) for the organization from the external servers (214) of the external computing system (108-1) can then be sent from the computer nodes in the set of computer nodes (104) in the virtual computer cluster (102-1), or platform message forwarders (e.g., 234 of FIG. 2B, etc.) therein, to the multitenant computing system (202).

Some or all of the platform-bound messages can be received by the multitenant computing system (202), or a platform input message processor 206 therein. These received platform-bound messages encapsulates some or all of the external-system-originated data for the organization for the specific service (or the specific features thereof) from the external computing system (108-1) or the external servers (214) therein. The external-system originated data for the organization may be extracted from the received messages by the platform input message processor (206) and then shared with other platform processing entities (e.g., application servers, etc.) in the multitenant computing system (202) through internal data connections/paths. The external-system-originated data for the organization and other data resident in the multitenant computing system (202) or collected from other data sources may be processed by the platform processing entities to make available the specific service or the specific features thereof to users and/or customers of the organization.

For the purpose of illustration only, two-way message processing or streaming scenarios have been described. It should be noted that, in various embodiments, a virtual computer cluster, or any node therein, may be used to stream data one way or two ways or in a multicast manner. Additionally, optionally or alternatively, multiple virtual computer clusters (e.g., one cluster for one way and the other cluster for the other way, etc.) can operate together to provide an overall streamer (or an overall streaming solution/application) to stream data between or among multiple communication counterparts.

2.4 Example Cluster Implementation

Figure 2C:
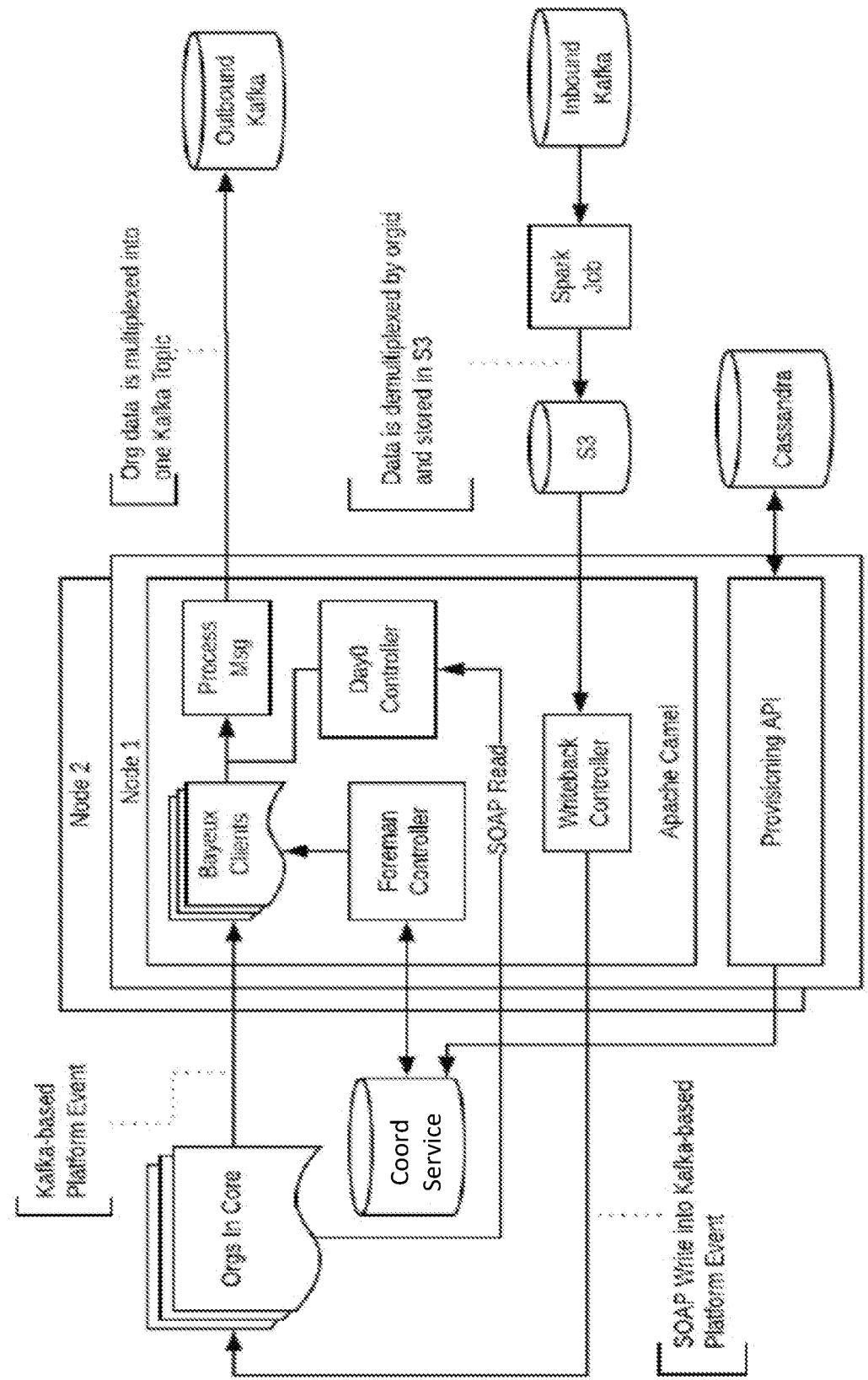

FIG. 2C illustrates an example system configuration in which a virtual computer cluster (e.g., 102-1 of FIG. 2A, etc.) mediating platform-data and external messages between a multitenant computer system (e.g., 202 of FIG. 2A or FIG. 2B, etc.) and an external computing system (e.g., 108-1 of FIG. 2A or FIG. 2B, etc.). Any of the system components as depicted in FIG. 2C may be implemented with one or more computing devices using software, hardware, a combination of software and hardware, etc.

A plurality of organizations (denoted as "Orgs in Core") may be hosted on one or more system instances (e.g., in one or more data centers, etc.) in the multitenant computing system, which may be a distributed system (as illustrated in FIG. 1) comprising a number of data centers and system instances in each of the data centers.

The virtual computer cluster may comprise one or more nodes (e.g., "Node 1," Node 2," etc.) at any given time. A node (e.g., "Node 1," etc.) in the virtual computer cluster may collect messages from one or both of the multitenant computing system and the external computing system using one or more data collection methods among a wide variety of data collection methods. Any, some or all of these data collection methods may be implemented based at least in part on one or more of: Spark Streaming, Kafka, Storm Topology, SOAP, Enterprise Message Platforms (EMP), S3, Cassandra, Flume, Amazon Kinesis, Spark SQL, Amazon Redshift, Amazon RDS, and so forth.

In some embodiments, the virtual computer cluster, or any node (e.g., "Node 1," "Node 2," etc.) therein, may use the same message communication mechanism(s) such as Kafka in an end-to-end message pipeline (e.g., one way, both ways, etc.) to communicate with both of the multitenant computing system and the external computing system. In some embodiments, the virtual computer cluster, or any node (e.g., "Node 1," "Node 2," etc.) therein, may use different message communication mechanisms such as two or more of Kafka, Cassandra, SOAP, etc., in an end-to-end message pipeline (e.g., one way, both ways, etc.) to communicate with the multitenant computing system and the external computing system.

Steady-state organization data (denoted as "Org data") may be retrieved for a set of organizations in the plurality of organizations ("Orgs in Core") from data stores or captured in real time or in near real time by the multitenant computing system. Some or all of the steady-state organization data ("Org data") for the set of organizations may be encapsulated or carried in messages representing Kafka-based platform events. These platform-originated messages may be enqueued or pushed into one or more first Kafka queues. The virtual computer cluster, or one or more Bayeux clients running on a node (e.g., "Node 1," etc.) therein, can dequeue or read these platform-originated messages from the first Kafka queues.

Non-steady-state organization data may be (e.g., at an initial time point to activate services or service features for the set of organizations, etc.) retrieved for the set of organizations in the plurality of organizations ("Orgs in Core") from data stores or captured in real time or in near real time by the multitenant computing system. Some or all of the non-steady-state organization data for the set of organizations may be read, processed, and/or transformed by a day0 controller running on a node (e.g., "Node 1,") in the virtual computer cluster.

A messaging block (denoted as "Process Msg") may process and transform the platform-originated messages containing the steady-state organization data ("Org data") as well as SOAP reads containing the non-steady-state organization data into corresponding external-system-bound messages. In some embodiments, the steady-state organization data ("Org data") and the non-steady-state organization data may be multiplexed (e.g., from multiple organizations, from multiple steady-state and/or non-steady-state jobs, etc.) into one Kafka topic and enqueued or pushed into one or more second Kafka queues (denoted as "Outbound Kafka"). The external computing system (not shown in FIG. 2C) can dequeue or read the external-system-bound messages from the second Kafka queues ("Outbound Kafka"). Some or all of the steady-state and non-steady-state organization data may be used (possibly along with other data collected from other data sources) by the external computing system to generate metrics (denoted as "Data") for the set of organizations in the plurality of organizations ("Orgs in Core").

The metrics generated by the external computing system for the organization (114-1) may be used to generate external-system-originated messages to encapsulate or carry some or all of the metrics generated by the external computing system for the set of organizations in the plurality of organizations ("Orgs in Core"), and enqueue or push these external-system-originated messages to one or more third Kafka queues. Spark jobs may be performed by one or more Spark applications (e.g., running on one or more platform servers in the multitenant systems, running on external servers in the network cloud, etc.) to dequeue these external-system-originated messages from the one or more third Kafka queues, and to store the metrics extracted from these messages in one or more S3 databases accessible by the virtual computer cluster. In some embodiments, the metrics ("Data") stored in the S3 databases are first demultiplexed by organization identifiers (denoted as "orgid") that uniquely identify their respective corresponding organizations in the set of organizations in the plurality of organizations ("Orgs in Core").

A writeback controller running on a node (e.g., "Node 1," etc.) in the virtual computer cluster may retrieve or pull the stored metrics ("Data") for the set of organizations in the plurality of organizations ("Orgs in Core") from the S3 databases. Some or all of the stored metrics ("Data") for the set of organizations may be encapsulated or carried in platform-bound messages representing Kafka-based platform events. The writeback controller may use SOAP writes to enqueue or push these platform-bound messages into one or more fourth Kafka queues. The multitenant computing system can dequeue or read these platform-bound messages from the fourth Kafka queues.

The multitenant computing system (202) can dequeue or read these messages from the fourth Kafka queues, and store some or all of the metrics in the data stores with other organization data for the set of organizations in the plurality of organizations ("Orgs in Core").

In some embodiments, some or all of Kafka queues, any file system used for performance improvement, and so forth, may be implemented outside the virtual computer cluster. In some embodiments, intermediate data generated by a node (e.g., "Node 1," etc.) in the virtual computer cluster such as transformed data by the node can be stored in a database or file system such as S3 that is external to the virtual computer cluster. These transformed data may be retrieved by the same or a different node in the virtual computer cluster for writeback to either the multitenant computing system and/or the external computing system.

Like other virtual computer clusters in the virtual computer clusters, the virtual computer cluster as illustrated in FIG. 2C may comprise a dynamic set of virtual computers (e.g., Amazon EC2 instances, etc.) to process or stream messages related to a specific external computing system among the external computing systems. As previously noted, each node (or virtual computer) in the virtual computer cluster may be a (virtual) computer (or an instance of computer) with a specific configuration of CPU, memory, data storage, network interfaces, etc., as provided by the cloud computing service. Each virtual computer can be loaded or installed with system software such as some or all of: (e.g., general, real time, customized, etc.) OS, network communications stacks, cloud-based database interfaces, cloud-based file system interfaces, cloud-based message interfaces, etc., as well as application software such as some or all of: authentication and/or authorization software, message processing and/or streaming software, message filtering and/or transformation software, database related software, network related software, file system related software, etc.

The dynamic set of virtual computers in the virtual computer cluster may comprise a changing number of virtual computers or nodes at one or more second time points subsequent to the first time point, depending on the total number of messages processed by the dynamic set of virtual computers as measured in set time intervals at or near the one or more second time points. The set of (e.g., one or more, etc.) computer nodes in the dynamic set of virtual computers can be used to process steady-state messages (e.g., messages to carry data generated by online transactions or operations in real time or in near real time, etc.) as well as non-steady-state (e.g., bursty, in highly varying message flows, sporadic, etc.) messages. In some embodiments, data entries representing messages or message sets to be processed or streamed by the virtual computer cluster may be kept in runtime job provisioning data stores (e.g., with a coordination service such as 264 of FIG. 2A, etc.) accessible by all nodes present in the virtual computer cluster. For example, a foreman controller running on a node (e.g., "Node 1," etc.) in the virtual computer cluster may access a set of data entries stored in the runtime job provisioning data stores at runtime to determine what streaming jobs are to be handled by Bayeux clients on the node, how many Bayeux clients need to be running to process messages of these streaming jobs, and so forth.

The data entries in the runtime job provisioning data store may be initially created by processing entities implementing provisioning APIs. These provisioning APIs may collect (e.g., through asynchronous notifications, active polling, pull operations, etc.) job provisioning related data kept in other data stores (denoted as "Cassandra") on an ongoing basis for the purpose of continually (e.g., repeatedly, iteratively, etc.) creating the data entries to represent messages or message sets to be processed or streamed by the virtual computer cluster. For example, the job provisioning related data kept in the other data stores ("Cassandra") may indicate that an organization has been verified for receiving a new service or new service features and thus a Day0 job is to be performed for the organization. Additionally, optionally or alternatively, timing information may be included in the job provisioning related data to indicate a selected time window for performing the Day0 job. Additionally, optionally or alternatively, multiple organizations may be batched in the same time window for one or more steady-state and/or non-steady-state jobs as described herein.

Thus, when the message processing/streaming workload is relatively low, the set of computer nodes may be (e.g., automatically, manually, mostly automatically with light human supervision, etc.) scaled to a relatively low number (e.g., 1, 2, etc.) of computer nodes. On the other hand, when the message processing/streaming workload increases, the set of computer nodes may be (e.g., automatically, manually, mostly automatically with light human supervision, etc.) scaled up to a relatively high number of computer nodes.

2.5 Cluster Scaling

FIG. 3 illustrates an example process flow that may be implemented and/or performed by one or more computing systems (or devices) as described herein.

A computer node (e.g., 104-1 of FIG. 2B, "Node 1," "Node 2," etc.) in a virtual computer cluster (e.g., 102-1 of FIG. 2A or FIG. 2B, as shown in FIG. 2C, etc.) as described herein, or a foreman controller (e.g., 262 of FIG. 2B, as shown in FIG. 2C, etc.) therein, may implement a timer that is set (e.g., when a previous timer has fired, when operations associated with the previous timer has finished, when the computer node starts, etc.) to fire at a later time corresponding to a time frequency or a time interval set forth in a node configuration file (e.g., as illustrated in TABLE 1, etc.).

In block 302, the computer node in the virtual computer cluster as described herein processes messages of steady-state and non-steady-state jobs and measures the total number of messages processed over a set time interval (e.g., repeatedly from one set time interval to another set time interval, etc.).

In block 304, upon the firing of the timer, the foreman controller may determine the total number of steady-state and non-steady-state messages that have processed by the computer node during a set time interval such as from the previous timer firing to the present timer firing, and compared the total number of steady-state and non-steady-state messages with a maximum total message number ("MessageCountUpperBound") and a minimum total message number ("MessageCountLowerBound") as specified in the node configuration file. In some embodiments, one or both of the minimum total message number threshold and the maximum total message number threshold can be set or optimized (e.g., through modeling, simulation, experimentation, system analysis, message traffic analysis, etc.) to maximize node resource usages for a particular set of system resource configuration such as offered by the cloud computing service while achieving relatively high performance.

In block 306, in response to determining that the total number of steady-state and non-steady-state messages is less (or fewer) than the minimum total message number ("MessageCountLowerBound"), the computer node evaluates the need of its existence and role in the virtual computer cluster and determine whether the computer node should be terminated.

In block 308, on response to determining that the computer node is to (or should) be terminated, the computer node tears down itself (or causes the cloud computing service to terminate the computer node).

On the other hand, in block 310, in response to determining that the computer node is not to (or should not) be terminated, the computer node competes for more work (e.g., processing new messages in addition to existing messages still be processed, etc.). For example, the foreman controller can look for one or more data entries (in the runtime job assignment data stores) that indicate one or more new sets of messages to be processed, mark these data entries to indicate the one or more new sets of messages will be processed by the computer node, and so forth. The process flow goes back to block 302 in which the computer node continues processing messages of steady-state and non-steady-state jobs and monitoring the total number of messages over the next set time interval.

In an example, the computer node may determine whether it is the last node in the virtual computer cluster. If so, the computer node continues to process messages. If not, the computer node tears down itself (or causes the cloud computing service to terminate the computer node).

In another example, in embodiments in which the virtual computer cluster implements a master-slave model among all the nodes in the cluster, the computer node may determine whether it is the master node in the virtual computer cluster. If so, the computer node continues to process messages. If not, the computer node tears down itself (or causes the cloud computing service to terminate the computer node).

In another example, in embodiments in which the virtual computer cluster implements a master-slave model among all the nodes in the cluster, the computer node may determine whether there is currently a master node in the virtual computer cluster. If not, the computer node becomes a master node and continues to process messages. Otherwise, the computer node tears down itself (or causes the cloud computing service to terminate the computer node).

Additionally, optionally or alternatively, the foreman controller may access runtime job assignment data stores (e.g., a coordination service such as 264 of FIG. 2A, etc.), or data entries therein, to determine whether there exist any data entries representing a sufficiently large number of new messages to be processed by the virtual computer cluster. In so, the foreman controller may mark one or more of the data entries to indicate that one or more new streaming jobs as represented by the one or more of the data entries have been taken by the computer node. On the other hand, in response to determining that there exist no data entries or that there exist data entries representing an insufficiently large number of new messages to be processed by the virtual computer cluster, the computer node refrains from taking new messages for processing, and tears down itself (or causes the cloud computing service to terminate the computer node) after all messages currently being processed by the computer node are processed. As used herein, "a sufficiently large number of messages" may refer to a total number of new messages that is sufficiently large to allow all existing computer nodes in the virtual computer cluster to process a respective total number of messages for the time frequency or the set time interval that is no fewer or less than the minimum total message number set forth in the node configuration file(s).

In some embodiments, in operational scenarios in which the computer node determines to tear down itself (or to cause the cloud computing service to terminate the computer node), the computer node may stop processing pending messages and may mark the pending messages or message sets in corresponding data entries in the runtime job assignment data stores as yet to be assigned. Remaining computer node(s) in the virtual computer cluster can take over processing the pending messages or message sets dropped by the computer node.

In block 312, in response to determining that the total number of steady-state and non-steady-state messages is no less (or no fewer) than the minimum total message number ("MessageCountLowerBound"), the computer nodes determines whether the total number of steady-state and non-steady-state messages is less than the maximum total message number ("MessageCountUpperBound").

In block 316, in response to determining that the total number of steady-state and non-steady-state messages is less than the maximum total message number ("MessageCountUpperBound"), the computer node competes for more work (e.g., processing new messages in addition to existing messages still be processed, etc.). For example, the foreman controller can look for one or more data entries (in the runtime job assignment data stores) that indicate one or more new sets of messages to be processed, mark these data entries to indicate the one or more new sets of messages will be processed by the computer node, and so forth. The process flow goes back to block 302 in which the computer node continues processing messages of steady-state and non-steady-state jobs and monitoring the total number of messages over the next set time interval.

In block 314, in response to determining that the total number of steady-state and non-steady-state messages is no less (or no fewer) than the maximum total message number ("MessageCountUpperBound"), the foreman controller of the computer node continues to process existing messages. The foreman controller can interact with the cloud computing service to cause a new node to be started and added into the virtual computer cluster. The new node, or a foreman controller therein, can look for one or more data entries (in the runtime job assignment data stores) that indicate one or more new sets of messages to be processed, mark these data entries to indicate the one or more new sets of messages will be processed by the newly started computer node, and so forth. The process flow goes back to block 302 in which the computer node continues processing messages of steady-state and non-steady-state jobs and monitoring the total number of messages over the next set time interval.

If the overall total number (or the overall count) of messages to be processed by the virtual computer cluster continues to increase, new node(s) are started and added to the virtual computer cluster to cause the total number of nodes to continue to go up in the virtual computer cluster.

In operational scenarios in which the computer node continues to operate without tearing down itself (or without causing the cloud computing service to terminate the computer node), the foreman controller may re-set the timer to fire at a later time corresponding to the frequency or the time interval set forth in the node configuration file.

Since the timer can be repetitively re-set by the foreman controller, the foregoing operations may be repetitively performed at the frequency or the time interval as specified in the node configuration file to allow the computer node to continually (e.g., from time to time, when the timer fires, etc.) evaluate the need and its role in the virtual computer cluster, to start new node(s) as appropriate, to tear down itself as appropriate, and so forth.

Additionally, optionally or alternatively, any other node such as any existing or newly started node in the virtual computer cluster can also perform the foregoing steps in the process flow to monitor its own workload, to evaluate whether such other node should be terminated in light workload conditions, to start new node(s) in heavy workload conditions, and so forth.

3.0 Example Embodiments

Figure 4:
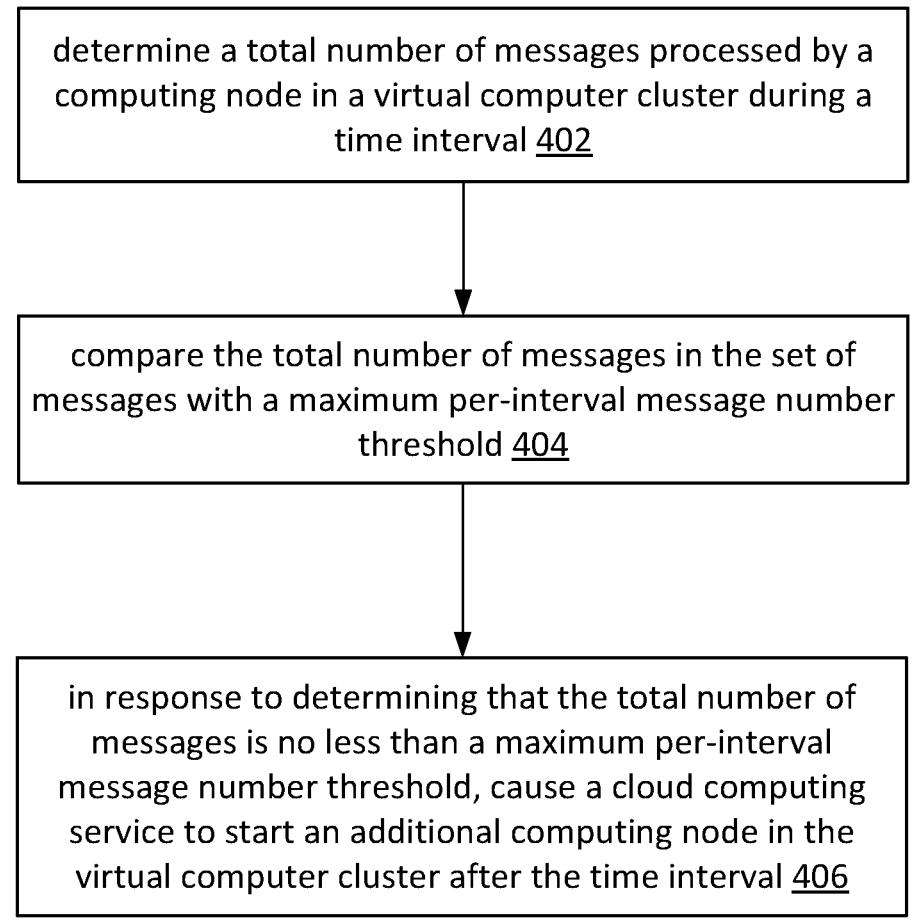

FIG. 4 illustrates an example process flow that may be implemented and/or performed by one or more computing systems (or devices) as described herein. In block 402, a computer node (e.g., 104-1 of FIG. 2B, "Node 1" or "Node 2" of FIG. 2C, etc.) determines a total number of messages (e.g., a message counter, etc.) in a set of messages that are processed by a computing node in a virtual computer cluster during a time interval. The virtual computer cluster is deployed with a cloud computing service. The virtual computer cluster includes the computing node and zero or more other computing nodes at an end time of the time interval.

In block 404, the computer node determines whether the total number of messages in the set of messages processed by the computing node is no less than a maximum per-interval message number threshold.

In block 406, in response to determining that the total number of messages is no less than a maximum per-interval message number threshold, the computer node causes the cloud computing service to start an additional computing node in the virtual computer cluster (e.g., after the time interval, etc.). The additional computing node is used to process one or more subsequent messages to be processed after the time interval.

In an embodiment, the computer node is configured to further perform: determining whether the total number of messages in the set of messages processed by the computing node is less than a minimum per-interval message number threshold; in response to determining that the total number of messages in the set of messages processed by the computing node is less than a minimum per-interval message number threshold, determining whether (e.g., after the time interval, etc.) the computing node is to be torn down and removed from the virtual computer cluster.

In an embodiment, determining whether (e.g., after the time interval, etc.) the computing node is to be torn down and removed from the virtual computer cluster includes determining whether the computing node represents a master node (e.g., after the time interval, etc.).

In an embodiment, determining whether (e.g., after the time interval, etc.) the computing node is to be torn down and removed from the virtual computer cluster includes determining whether the virtual computer cluster comprises only a minimum number of computing nodes (e.g., after the time interval, etc.).

In an embodiment, the computer node is configured to further perform: in response to determining that the total number of messages is less than a maximum per-interval message number threshold, continuing processing one or more subsequent messages after the time interval without causing the cloud computing service to start an additional computing node in the virtual computer cluster after the time interval.

In an embodiment, a multitenant computing system interacts with an external computing system through the virtual computer cluster; the set of messages is made up of one or more of: messages from the multitenant computing system, messages from the external computing system, messages to the multitenant computing system, or messages to the external computing system.

In an embodiment, the set of messages pertains to a plurality of organizations hosted in the multitenant computing system; each message in the set of messages is tagged with a unique organization identifier among a plurality of unique organization identifiers; each unique organization identifier uniquely identifies a respective organization in the plurality of organizations.

In an embodiment, the set of messages includes both streaming messages and non-streaming messages.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
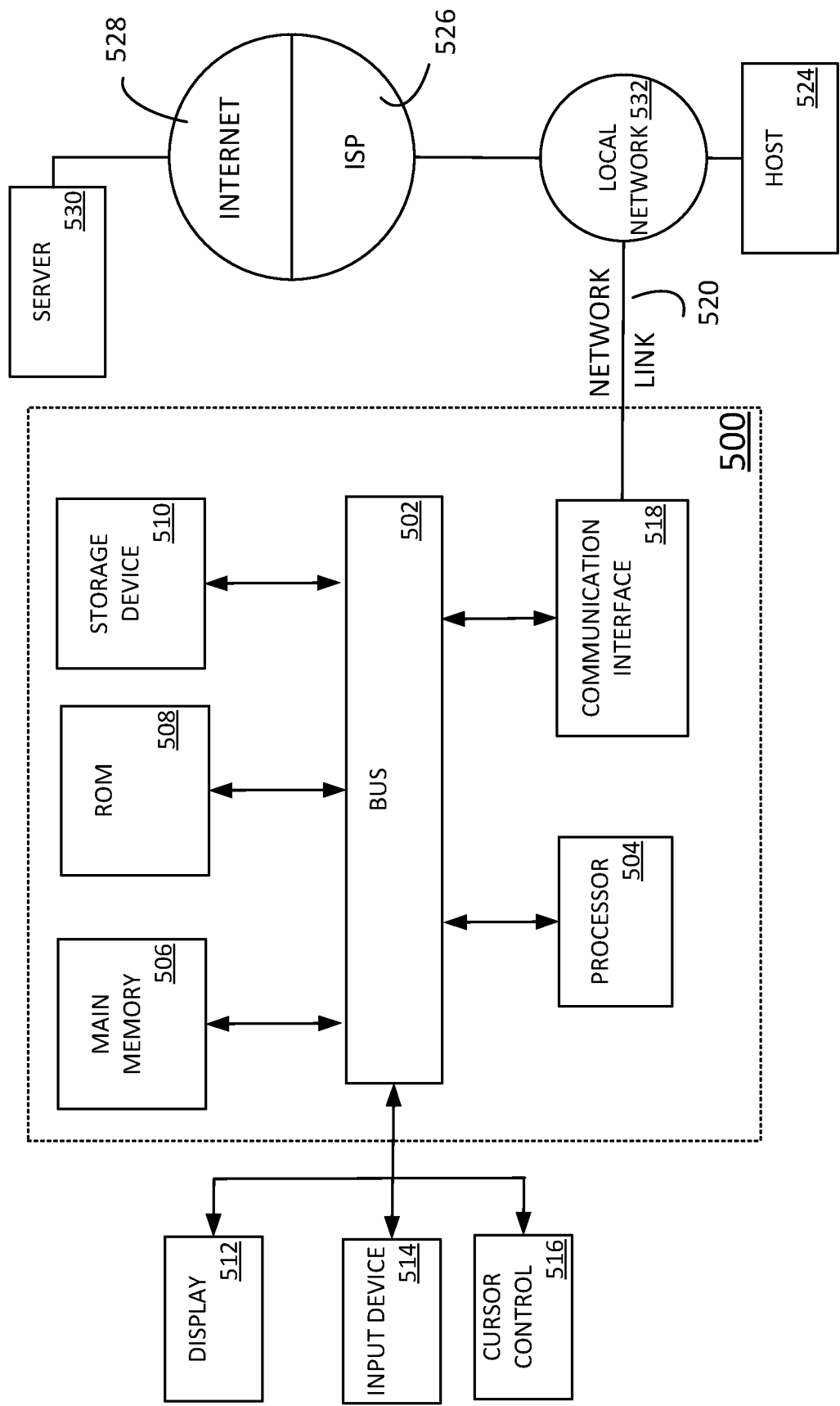
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   determining, by each computing node in a virtual computer cluster, a total number of messages in a set of messages that are processed by the computing node in the virtual computer cluster during a time interval, wherein the virtual computer cluster is deployed with a cloud computing service, wherein the virtual computer cluster includes the computing node and one or more other computing nodes at an end time of the time interval, wherein each of the computing node and the one or more other computing nodes represents a virtual computer running its own operating system;
   wherein the set of messages comprises a mix of steady-state and non-steady state streaming messages transmitted between a multitenant computing system and an external system; wherein the multitenant computing system includes the virtual computer cluster;
   determining, by the computing node, whether the total number of messages in the set of messages processed by the computing node is no less than a maximum per-interval message number threshold; and
   in response to determining that the total number of messages is no less than a maximum per-interval message number threshold, starting an additional computing node, by the cloud computing service, in the virtual computer cluster after the time interval, wherein the additional computing node is used to process one or more subsequent messages to be processed after the time interval.

2. The method as recited in claim 1, further comprising:
   determining whether the total number of messages in the set of messages processed by the computing node is less than a minimum per-interval message number threshold; and
   in response to determining that the total number of messages in the set of messages processed by the computing node is less than a minimum per-interval message number threshold, determining whether, after the time interval, the computing node is to be torn down and removed from the virtual computer cluster.

3. The method as recited in claim 1, further comprising: determining whether at least one of the one or more computing nodes represents a master node after the time interval.

4. The method as recited in claim 1, further comprising: determining whether the virtual computer cluster comprises only a minimum number of computing nodes after the time interval.

5. The method as recited in claim 1, further comprising: in response to determining that the total number of messages is less than a maximum per-interval message number threshold, processing one or more subsequent messages after the time interval without causing the cloud computing service to start an additional computing node in the virtual computer cluster after the time interval.

6. The method as recited in claim 1, wherein the multitenant computing system interacts with the external computing system through the virtual computer cluster, wherein the set of messages is made up of one or more of: messages from the multitenant computing system, messages from the external computing system, messages to the multitenant computing system, or messages to the external computing system.

7. The method as recited in claim 6, wherein the set of messages pertains to a plurality of organizations hosted in the multitenant computing system, and wherein each message in the set of messages is tagged with a unique organization identifier among a plurality of unique organization identifiers, and wherein each unique organization identifier uniquely identifies a respective organization in the plurality of organizations.

8. One or more non-transitory computer readable media storing a program of instructions that is executable by a device to perform:
determining, by each computing node in a virtual computer cluster, a total number of messages in a set of messages that are processed by the computing node in the virtual computer cluster during a time interval, wherein the virtual computer cluster is deployed with a cloud computing service, wherein the virtual computer cluster includes the computing node and one or more other computing nodes at an end time of the time interval, wherein each of the computing node and the one or more other computing nodes represents a virtual computer running its own operating system;
wherein the set of messages comprises a mix of steady-state and non-steady state streaming messages transmitted between a multitenant computing system and an external system; wherein the multitenant computing system includes the virtual computer cluster;
determining, by the computing node, whether the total number of messages in the set of messages processed by the computing node is no less than a maximum per-interval message number threshold; and
in response to determining that the total number of messages is no less than a maximum per-interval message number threshold, starting an additional computing node, by the cloud computing service, in the virtual computer cluster after the time interval, wherein the additional computing node is used to process one or more subsequent messages to be processed after the time interval.

9. The one or more non-transitory computer readable media as recited in claim 8, wherein the program of instructions further comprises instructions that are executable by the one or more computing processors to perform:
determining whether the total number of messages in the set of messages processed by the computing node is less than a minimum per-interval message number threshold; and
in response to determining that the total number of messages in the set of messages processed by the computing node is less than a minimum per-interval message number threshold, determining whether, after the time interval, the computing node is to be torn down and removed from the virtual computer cluster.

10. The one or more non-transitory computer readable media as recited in claim 8, wherein the program of instructions is executable by the device to further perform: determining whether at least one of the one or more computing nodes represents a master node after the time interval.

11. The one or more non-transitory computer readable media as recited in claim 8, wherein the program of instructions is executable by the device to further perform: determining whether the virtual computer cluster comprises only a minimum number of computing nodes after the time interval.

12. The one or more non-transitory computer readable media as recited in claim 8, wherein the program of instructions further comprises instructions that are executable by the one or more computing processors to perform: in response to determining that the total number of messages is less than a maximum per-interval message number threshold, processing one or more subsequent messages after the time interval without causing the cloud computing service to start an additional computing node in the virtual computer cluster after the time interval.

13. The one or more non-transitory computer readable media as recited in claim 8, wherein the multitenant computing system interacts with the external computing system through the virtual computer cluster, wherein the set of messages is made up of one or more of: messages from the multitenant computing system, messages from the external computing system, messages to the multitenant computing system, or messages to the external computing system.

14. The one or more non-transitory computer readable media as recited in claim 13, wherein the set of messages pertains to a plurality of organizations hosted in the multitenant computing system, and wherein each message in the set of messages is tagged with a unique organization identifier among a plurality of unique organization identifiers, and wherein each unique organization identifier uniquely identifies a respective organization in the plurality of organizations.

15. A system, comprising:
one or more computing processors;
one or more non-transitory computer readable media storing a program of instructions that is executable by the one or more computing processors to perform:
determining, by each computing node in a virtual computer cluster, a total number of messages in a set of messages that are processed by the computing node in the virtual computer cluster during a time interval, wherein the virtual computer cluster is deployed with a cloud computing service, wherein the virtual computer cluster includes the computing node and one or more other computing nodes at an end time of the time interval, wherein each of the computing node and the one or more other computing nodes represents a virtual computer running its own operating system;
wherein the set of messages comprises a mix of steady-state and non-steady state streaming messages transmitted between a multitenant computing system and an external system; wherein the multitenant computing system includes the virtual computer cluster;

determining, by the computing node, whether the total number of messages in the set of messages processed by the computing node is no less than a maximum per-interval message number threshold; and in response to determining that the total number of messages is no less than a maximum per-interval message number threshold, starting an additional computing node, by the cloud computing service, in the virtual computer cluster after the time interval, wherein the additional computing node is used to process one or more subsequent messages to be processed after the time interval.

16. The system as recited in claim 15, wherein the program of instructions further comprises instructions that are executable by the one or more computing processors to perform:

determining whether the total number of messages in the set of messages processed by the computing node is less than a minimum per-interval message number threshold; and in response to determining that the total number of messages in the set of messages processed by the computing node is less than a minimum per-interval message number threshold, determining whether, after the time interval, the computing node is to be torn down and removed from the virtual computer cluster.

17. The system as recited in claim 15, wherein the program of instructions further comprises instructions that are executable by the one or more computing processors to perform: determining whether at least one of the one or more computing nodes represents a master node after the time interval.

18. The system as recited in claim 15, wherein the program of instructions further comprises instructions that are executable by the one or more computing processors to perform: determining whether the virtual computer cluster comprises only a minimum number of computing nodes after the time interval.

19. The system as recited in claim 15, wherein the program of instructions further comprises instructions that are executable by the one or more computing processors to perform: in response to determining that the total number of messages is less than a maximum per-interval message number threshold, processing one or more subsequent messages after the time interval without causing the cloud computing service to start an additional computing node in the virtual computer cluster after the time interval.

20. The system as recited in claim 15, wherein the multitenant computing system interacts with the external computing system through the virtual computer cluster, wherein the set of messages is made up of one or more of: messages from the multitenant computing system, messages from the external computing system, messages to the multitenant computing system, or messages to the external computing system.

21. The system as recited in claim 20, wherein the set of messages pertains to a plurality of organizations hosted in the multitenant computing system, and wherein each message in the set of messages is tagged with a unique organization identifier among a plurality of unique organization identifiers, and wherein each unique organization identifier uniquely identifies a respective organization in the plurality of organizations.

* * * * *